Patented Sept. 30, 1952

2,612,523

UNITED STATES PATENT OFFICE 2,612,523

PROCESS FOR PREPARING PURE WELL-CRYSTALLIZED HEXANITRODIPHENYL-AMINE

Jan Hendrik Dijkema, Haarlem, Netherlands, assignor to A/S Norduco, Oslo, Norway, a Norwegian company No Drawing. Application June 27, 1950, Serial No. 170,706. In the Netherlands June 30, 1949

7 Claims. (Cl. 260—576)

This invention relates to a process for preparing pure, well-crystallized 2,4,6,2′,4′,6′-hexanitrodiphenylamine by means of a two-stage nitration of 2,4-dinitrodiphenylamine.

2,4,6,2′,4′,6′-hexanitrodiphenylamine (dipicrylamine) is usually prepared by nitration in two separate stages from 2,4-dinitrodiphenylamine obtained by condensation with aniline of 1-chloro-2,4-dinitrobenzene. When so doing dinitrodiphenylamine is first nitrated to tetranitrodiphenylamine by means of nitric acid of 50 to 60% concentration at temperatures of, for instance, 50 to 90° C., the resulting tetranitrodiphenylamine is then further nitrated by means of nitric acid of 96 to 98% concentration at temperatures of from 80 to 90° C., or by means of a mixture of approximately equal parts by weight of nitric acid and sulphuric acid, both of 93 to 98% concentration, at temperatures of 25 to 30° C., and thus converted into hexanitrodiphenylamine. These known processes entail various drawbacks; the principal ones are as follows:

The tetranitro product formed in the first stage crystallizes poorly and in this connection it is necessary to use a large excess of acid with respect to the dinitro compound, for instance an 8- to 10-fold quantity by weight, as otherwise a thick slurry would form which cannot be stirred; this drawback also presents itself in the final nitration by means of a mixture of equal parts of nitric acid and sulphuric acid. Further, decomposition-reactions occur at the high temperatures at which the first and possibly also the second nitration is carried out, which leads to reduction of yields.

In addition, both the tetranitro product formed in the first stage and the hexanitro product formed in the final nitration are difficult to separate from the acid liquid and to wash acid-free owing to the poorly crystallized form in which they are obtained, while in dry condition they are apt to dust.

A further drawback is that the hexanitrodiphenylamine obtained by the aforesaid known processes is not entirely pure. As a rule this does not constitute an objection for normal application, but it does when the product is intended for recovering potassium from dilute aqueous solutions containing potassium salts such as sea-water. In this latter application, described, for instance, in U. S. A. Patent No. 2,258,381, it is necessary for the hexanitrodiphenylamine to have a high grade of purity.

The present invention now provides a process which makes it possible to prepare from dinitrodiphenylamine hexanitrodiphenylamine in well-crystallized and very pure form and with a high yield by nitration in two stages, without the drawbacks of the processes hitherto known. The product thus obtained is directly suitable for use in the aforesaid process for the recovery of potassium.

The process according to the invention consists in the nitration of dinitrodiphenylamine being carried out with nitration acid containing besides nitric acid at most 25%, preferably about 20%, by weight of water and containing at most 20% by weight of sulphuric acid and the tetranitrodiphenylamine thus obtained being subsequently subjected to a further nitration with a mixture of concentrated nitric acid and concentrated sulphuric acid in which the ratio by weight of $HNO_3 : H_2SO_4$ is between 3:1 and 10:1.

It has been found that when using nitration acid which contains not more than 25%, e. g. 20 to 25% of water and not more than 20%, e. g. 10 to 20%, of sulphuric acid, the dinitrodiphenylamine is dissolved in the acid in the first stage of the process according to the invention and that the nitration proceeds smoothly and completely at temperatures ranging between 20 and 30° C., whilst using, for instance, a sixfold quantity (by weight) of acid. Throughout the nitration the mixture remains thinly liquid and easy to stir, owing to the fact that during the nitration the tetranitrodiphenylamine formed separates off in well-crystallized state.

Though the nitration acid used in the first stage of the present process, which does not contain more than 25% of water, need not contain any sulphuric acid and can thus consist of nitric acid of at least 75% concentration, for instance, a concentration of from 75 to 80%, it is preferable to use nitration acid which contains, besides nitric acid, not more than 20% of sulphuric acid. A suitable composition of the acid for use in the first nitration stage is, for instance: 65% $HNO_3$, 15% $H_2SO_4$ and 20% $H_2O$. For economical reasons it is advantageous to use for this first nitration stage the residual acid of the second stage of the nitration.

During the first stage of the process according to the invention the tetranitrodiphenylamine is precipitated in well-crystallized form. If so desired, the small quantities of tetranitro compound still dissolved in the acid can be precipitated in crystalline state by diluting the reaction mixture with water in such a quantity as to lower the $HNO_3$-concentration of the reaction mixture to 50 to 55%.

However, in this diluting operation impurities, which may originate from the dinitrodiphenylamine, also precipitate, as a result of which the tetranitrodiphenylamine, the yield of which will then be a few per cent higher, will be less pure than when diluting had been omitted; such a less pure product also yields a sufficiently pure hexanitrodiphenylamine in the subsequent second nitration stage.

Since the tetranitro compound formed in the first stage of the present process, which can be separated from the acid liquid by centrifuging or filtering, is obtained in well-crystallized state, it can easily be washed acid-free to a product which can easily be dried.

In the second stage of the process according to the invention the tetranitrodiphenylamine obtained in the first stage with a yield of from about 87 to 92% (depending on whether or not the reaction mixture was diluted with water after the first nitration) is further nitrated with nitration acid which consists of a mixture of concentrated—i. e. 95 to 98% concentration—nitric acid and sulphuric acid in which the ratio by weight between $HNO_3$ and $H_2SO_4$ is between 3:1 and 10:1.

When using nitration acid of the composition referred to above the nitration of the tetranitrodiphenylamine takes place smoothly and completely at temperatures as low as 20 to 30° C., which is not the case when using concentrated nitric acid alone, whereby the nitration is still slow, even at higher temperature, while decomposition occurs in addition.

Further the hexanitrodiphenylamine formed crystallizes satisfactorily to relatively big crystals during the nitration, so that a thin suspension is maintained throughout the nitration, as a result of which the use of a relatively small quantity of nitration acid, for instance, a fivefold quantity by weight, will be ample. By so doing a well-crystallized product (size of crystals 0.5 to 2 mm.) is obtained, which after washing (first with dilute nitric acid and then with water) and drying yields a very pure final product.

To obtain these favourable results it has been found essential that the weight ratio between $HNO_3$ and $H_2SO_4$ in the nitration acid used for the second nitration stage is at least 3:1. If this ratio is smaller the product obtained is less pure, and this degree of purity is lower, the more $H_2SO_4$ is contained in the nitration acid. Moreover, in that case, the crystallization steadily deteriorates with increasing $H_2SO_4$ content, which results in the product precipitating in a very voluminous form, so that it is necessary to use a large excess of nitration acid—for instance, an 8- to 10-fold quantity by weight—to avoid the formation of a thick slurry which cannot be stirred.

Although the weight ratio between $HNO_3$ and $H_2SO_4$ in the nitration acid to be used in the second stage may be as high as 10:1, it is preferred to use a nitration acid in which this ratio does not exceed 6:1, as otherwise the crystallization of the hexanitrodiphenylamine will again deteriorate.

The second nitration is preferably carried out with nitration acid in which the ratio $HNO_3$:$H_2SO_4$ is between 4.5:1 and 5.5:1, since this gives the best results, and with a 5-fold quantity by weight of nitration acid, since it has been found that when a smaller quantity of acid is used the crystallization deteriorates by the end of the nitration process.

After completion of the final nitration, during which the hexanitrodiphenylamine formed separates in well-crystallized form, the reaction mixture, from which the crystals or part thereof may have been removed, is preferably diluted with water to a water content of 20 to 25%, so that the small quantities of hexanitrodiphenylamine which are still present in the solution also crystallize.

The crystallized hexanitrodiphenylamine, which can be separated from the residual acid by centrifuging or filtering, can easily be washed acid-free and is, after drying, recovered in a very pure, well-crystallized form and with an excellent yield, exceeding 85%, for instance 87 to 90%, referred to the weight of the dinitrodiphenylamine.

The residual acid of the final nitration, the water content of which has been brought to 20 to 25%, can be used as nitration acid for the first stage of the process, if necessary, after adjustment to the desired composition by addition of nitric acid.

The quantity of residual acid recovered from the final nitration of a given quantity of tetranitro compound is sufficient for the nitration of an equivalent quantity of dinitro compound.

The possibility of using the residual acid of the final nitration for the first nitration is of course of practical importance in the present process, since a considerable saving in acid is involved.

Both during the first and during the second nitration stage the temperature is preferably kept below 35° C., for instance between 25 and 30° C., and to this end the necessary cooling arrangements must be made.

Although the process can also be carried out at higher temperatures, for instance at 40 to 50° C., this has been found to be less suitable, since it involves losses of nitric acid owing to vaporization, particularly in the final nitration.

The process according to the invention is further illustrated with reference to the following example but without being limited thereto.

*Example*

To a nitration vessel of 2.5 cu. m. capacity, equipped with stirrer, cooling coil, thermometers and a dosing arrangement for solid substance, was fed 1900 kg. of nitration acid, consisting of 65% $HNO_3$, 14% $H_2SO_4$ and 21% $H_2O$, which acid originated from the second stage of a previous nitration. 290 kg. dinitrodiphenylamine was uniformly added, while stirring, in 2 to 3 hours with the aid of the dosing arrangement, whilst the temperature was maintained at 25 to 30° C. by cooling. After adding 58 kg. of the dinitro compound—which dissolved in the acid and gave it a red colour—and after adding seed crystals of tetranitrodiphenylamine to promote crystallization, the tetranitrodiphenylamine formed began to crystallize. After the addition of the dinitro compound had been completed stirring was continued for about 1 hour to make the nitration complete; subsequently 250 kg. of water was added to the mixture while stirring, in from 1 to 1½ hours, whereby the tetranitrodiphenylamine which was still dissolved in the acid precipitated in crystalline form. The crystallized product was then separated from the acid liquid by centrifuging and was dried after having been thoroughly washed with water.

The well-crystallized tetranitrodiphenylamine of which the quantity obtained was 350 kg. and which had a melting point of about 195° C., was then uniformly added with the dosing arrangement, while stirring in 2 to 3 hours, to a similar nitration vessel, containing 1745 kg. of nitration acid consisting of 291 kg. of sulphuric acid and 1454 kg. of nitric acid, both of 96% concentration, whilst maintaining the temperature between 25 and 30° C. by cooling. After the addition of the first 70 kg. of the tetranitro compound and of seed crystals the hexanitrodiphenylamine formed began to crystallize. After the entire quantity of tetranitro compound had been added the mixture was left standing for 1 hour; it was then slowly diluted, while stirring, with 297 kg. of water in 1 to 1½ hours, whilst thoroughly cooling so as to keep the temperature below 35° C. The hexanitrodiphenylamine still in solution then separated off in well-crystallized form. The mixture was subsequently further cooled down to 20° C., after which the crystals could easily be separated by centrifuging from the residual acid mixture. The product thus separated was then first washed with nitric acid of from 30 to 40% concentration and subsequently with water and finally dried.

The yield was 425 kg. of well-crystallized, pure hexanitrodiphenylamine (melting point between 245 and 246° C.), which corresponds to a yield of nearly 87% based on the dinitro compound used as initial material.

The residual acid (1900 kg.) recovered from the final nitration consisted of 65% $HNO_3$, 14% $H_2SO_4$ and 21% $H_2O$ and could be used again for the nitration of dinitrodiphenylamine.

I claim:

1. A process for preparing pure, well-crystallized hexanitrodiphenylamine from 2,4-dinitrodiphenylamine by nitration in two stages, comprising the steps of nitrating said dinitro compound in a first nitration stage by means of a nitration acid essentially consisting of nitric acid and of minor but substantial amounts of water and sulphuric acid not exceeding 25% and 20% by weight respectively, separating off the thus obtained tetranitrodiphenylamine crystals from the nitration acid, nitrating the tetranitrodiphenylamine in a second nitration stage by means of a mixture of concentrated nitric acid and concentrated sulphuric acid in which the ratio by weight of $HNO_3 : H_2SO_4$ is between 3:1 and 10:1, both nitration stages being carried out at a temperature not exceeding 50° C. and the amount of nitration acid being sufficient to maintain the reaction mixture readily stirrable, and separating the hexanitrodiphenylamine crystals from the nitration acid.

2. A process for preparing pure, well-crystallized hexanitrodiphenylamine from 2,4-dinitrodiphenylamine by nitration in two stages, comprising the steps of nitrating said dinitro compound in a first nitration stage by means of a nitration acid essentially consisting of nitric acid, 20 to 25% by weight of water and 10 to 20% by weight of sulphuric acid, separating the thus obtained tetranitrodiphenylamine crystals from the nitration acid, nitrating the tetranitrodiphenylamine in a second nitration stage by means of a mixture of concentrated nitric acid and concentrated sulphuric acid in which the ratio by weight of $HNO_3 : H_2SO_4$ is between 3:1 and 10:1, both nitration stages being carried out at a temperature not exceeding 50° C. and the amount of nitration acid being sufficient to maintain the reaction mixture readily stirrable, and separating the hexanitrodiphenylamine crystals from the nitration acid.

3. A process as claimed in claim 1, wherein the acid mixture used in the second nitration stage the ratio by weight of $HNO_3 : H_2SO_4$ is between 3:1 and 6:1.

4. A process as claimed in claim 1, wherein the second nitration stage is carried out by means of a 5-fold quantity by weight of the nitration acid.

5. A process as claimed in claim 2, wherein the second nitration stage is carried out by means of a 5-fold quantity by weight of a mixture of concentrated nitric acid and concentrated sulphuric acid in which the ratio by weight of $HNO_3 : H_2SO_4$ is between 4.5:1 and 5.5:1.

6. A process as claimed in claim 1, wherein at both nitration stages the temperature is maintained between 20 and 35° C.

7. A process for preparing pure, well-crystallized hexanitrodiphenylamine from 2,4-dinitrodiphenylamine by nitration in two stages, comprising the steps of nitrating said dinitro compound in a first nitration stage by means of nitration acid essentially consisting of nitric acid, 20 to 25% by weight of water and 10 to 20% by weight of sulphuric acid, separating off the thus obtained tetranitrodiphenylamine crystals from the nitration acid, nitrating the tetranitrodiphenylamine in a second nitration stage by means of a 5-fold quantity by weight of a mixture of concentrated nitric acid and concentrated sulphuric acid in which the ratio by weight of $HNO_3 : H_2SO_4$ is between 4.5:1 and 5.5:1, both nitration stages being carried out at a temperature between 20 and 35° C. and separating the hexanitrodiphenylamine crystals from the nitration acid.

JAN HENDRIK DIJKEMA.

REFERENCES CITED

The following references are of record in the file of this patent:

FOREIGN PATENTS

| Number | Country | Date |
| --- | --- | --- |
| 86,295 | Germany | July 12, 1895 |

OTHER REFERENCES

Carter: Schiess-Sprengstoffe, vol. 8, pp. 205–206, 1913.

Mikhalilov: Chem. Abstracts, vol. 38, p. 52285 (1944).